United States Patent
Bergenwall

(10) Patent No.: US 7,283,474 B1
(45) Date of Patent: Oct. 16, 2007

(54) PACKET DATA TRANSMISSION CONTROL

(75) Inventor: Martin Bergenwall, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/980,075

(22) PCT Filed: Jun. 4, 1999

(86) PCT No.: PCT/EP99/03875

§ 371 (c)(1),
(2), (4) Date: Jan. 4, 2002

(87) PCT Pub. No.: WO00/76139

PCT Pub. Date: Dec. 14, 2000

(51) Int. Cl.
*H04L 12/26* (2006.01)
*H04L 12/28* (2006.01)
*H04Q 7/00* (2006.01)

(52) U.S. Cl. .............. 370/235; 370/401; 370/328

(58) Field of Classification Search .............. None
See application file for complete search history.

(56) References Cited

U.S. PATENT DOCUMENTS

| | | | |
|---|---|---|---|
| 6,438,101 B1 * | 8/2002 | Kalampoukas et al. | 370/229 |
| 6,608,832 B2 * | 8/2003 | Forslow | 370/353 |
| 6,839,339 B1 * | 1/2005 | Chuah | 370/349 |
| 6,937,566 B1 * | 8/2005 | Forslow | 370/231 |

FOREIGN PATENT DOCUMENTS

WO  WO96/36150  11/1996

OTHER PUBLICATIONS

Aldar C. F. Chan, TCP over wirless links, 1997, IEEE, pp. 1326-1330.*

Kalampoukas Lampros, Explitcit Window Adaptation: a method to Enhance TCP performance, 1998, IEEE, pp. 242-251.*

Samir goel, Improving TCP performance over wirless links, 1998, IEEE, pp. 332-335.*

H. Chaskar, On The Design of interfaces for TCP/IP over wireless, 1996, IEEE, pp. 199-203.*

Ziegler T. et al., "Congestion Avoidance with BUC (Buffer Utilization Control) Gateways and RFCN (Reverse Feedback Congestion Notification)", IEEE International Performance, Commuting and Communication Conference, U.S. New York, IEEE, Feb. 5, 1997, p. 410-418 XP000753707.

Aakesson S: "GPRS, General Packet Radio Service", International Conference on Universal Personal Communication, US, IEEE, New York, NY, Nov. 6, 1995, p. 640-643 XP002027565.

Bhagwat P et al., "Using Channel State Dependent Packet Scheduling to Improve TCP Throuhput Over Wireless Lans" Wireless Networks, US, ACM, vol. 3, No. 1, Mar. 1, 1997, p. 91-102 XP000688204.

* cited by examiner

*Primary Examiner*—Steven Nguyen
(74) *Attorney, Agent, or Firm*—Squire, Sanders & Dempsey L.L.P.

(57) ABSTRACT

A packet data transmission network system is disclosed which comprises a receiver (1), a sender (2) for transmitting data packets to the receiver (1) through a packet data connection via a network element (3). The receiver (1) acknowledges each received data packet by an acknowledgment message which contains header data comprising a window size, the number of transmitted bytes for which the sender (2) has not received an acknowledgment from the receiver (1) being not allowed to exceed the window size. The network element (3) buffers data packets transmitted by the sender (2) and examines and modifies the header data. According to the invention, the network element (3) detects transmission conditions and modifies the window size accordingly.

19 Claims, 2 Drawing Sheets

PACKET DATA TRANSMISSION CONTROL

PRIORITY CLAIM

This is a national stage of PCT application No. PCT/EP99/03875, filed on Jun. 4, 1999.

BACKGROUND OF THE INVENTION

Field of the invention

The present invention relates to a packet data transmission network system and method and a network element such as an SGSN (Serving GPRS Support Node) network element for setting a window size in a system like GPRS/3G (General Packet Radio Service/Third Generation).

In a network system in which a receiver like a mobile terminal has a packet data connection such as TCP/IP (Transport Control Protocol/Internet Protocol) to a sender like a service provider, a windowing mechanism is used to make transmitting operations more efficient. In a transmitting operation, the service provider sends TCP/IP data packets to the mobile terminal and the mobile terminal acknowledges the receipt of the packets via acknowledgment messages. The windowing mechanism allows the sender to send several packets before receiving an acknowledgment.

The maximum window size is specified in each acknowledgment message as the number of bytes the receiver, i.e. the mobile terminal, is still able to receive. For this purpose, the TCP header contains a field in which the maximum window size is determined. The sender, i.e. the service provider, is not allowed to exceed the maximum window size and may only send packets up to this limit.

In systems with a radio part such as GSM/GPRS (Global System for Mobile communications/General Packet Radio Service) and UMTS (Universal Mobile Telecommunications System) the transmission rate can vary because of bad radio conditions. The rate decreases when the mobile system specific error correcting protocol such as LLC (Logical Link Control) has to interrupt the normal transmission and perform retransmissions. Also other factors like the available radio capacity may decrease the rate for most effective packet transmission.

When the transmission rate decreases for a TCP/IP packet data connection the downlink IP packets (the packets sent by the service provider) have to be buffered. In GPRS the buffering takes place in an SGSN network element. If the rate decreases for a long time, TCP retransmission timers for the buffered packets might expire since they cannot be acknowledged. In addition, there might be not enough buffering space in the SGSN network element so that some packets have to be discarded. Therefore, an adverse change in radio conditions and/or buffering space results in transmission inefficiency and unnecessary retransmissions over the TCP connection because the sender is not aware of the changed conditions.

Thus, the sender has somehow to be informed that the ability of the mobile terminal to receive packets has temporarily decreased and IP packets should not be sent as fast as before. This must be effected with standardized methods since it cannot be required for the sender to know any mobile system specific means.

In normal operation, TCP/IP makes use of slow start and congestion avoidance algorithms to deal with errors. Hence, the window size is dropped when a time-out occurs and is then slowly increased. The sender then waits for an acknowledgment message of a TCP/IP packet from the receiver. Because the packet is buffered or discarded in the SGSN network element a timer in the sender expires and slow start and congestion avoidance are applied in combination with retransmission of the unacknowledged data packets. Thus, the sender sends only one packet (or a few packets) before it receives an acknowledgment message and then increases the window size step by step and sends more before next acknowledgments.

This also works in cellular packet transmission but a retransmission is required for slow start and congestion avoidance to start. The slow start and congestion avoidance is even slower in again adapting to improved conditions if the decreased conditions where only temporal.

The IP protocol family includes a protocol called ICMP (Internet Control Message Protocol) which specifies a message called Source Quench to advise the sender that it should slow down the transmission. Later, if no Source Quench messages are received for a while the sender again slowly increases the transmission rate. However, the adaptation speed to the changed conditions is slow. Moreover, some firewalls also filter out the Source Quench message so that the sender does not get the information.

In the patent application WO96/36150 a digital data transmission system is defined in which the transmitting and receiving parties can change the size of a sliding window when one or both of them receive information from control means that the data transmission capacity of the connection has changed. However, in a case when the transmitting and receiving parties do not even know about any reason to change the window size, no adaptation to changed conditions takes place and unnecessary retransmission may have to be performed.

Furthermore, a method called Fast Recovery is known that tries to enhance the adaptation speed to better conditions. However, this method still requires at least one retransmission. Moreover, the Fast Recovery is adapted to operate with congested routers and not radio conditions so that it does not work in a very optimal way with cellular packet data because the characteristics of the service degradation are very different.

By Ziegler T. et al.: 'Congestion Avoidance with BUC Gateways and RFCN', IEEE International Performance, Computing and Communications Conference, US, New York, IEEE, Feb, 5, 1997, pp. 410-418, a BUC (Buffer Utilization Control) algorithm is disclosed which is executed in a so called BUC gateway. Moreover, a signaling mechanism called RFCN (Reverse Feedback Congestion Notification) is disclosed. RFCN is applicable to transport protocols using sliding window flow control, e.g. TCP. According to window flow control, the receiver transmits its available buffer size to the sender in a window-field in the ACK-header. The BUC algorithm may update the credit value in this window field to its computed window to control the transmission rate of a data-sender. For this purpose, each conversion maintains two per-conversation-queues at two distinct output-ports at the BUC gateway. From the view of a data-sender one of these per-conversation-queues is the "forward queue", i.e. the queue storing the packets sent by the data-sender. The other per-conversation-queue is the "backward queue", the queue storing the ACKs to be received by the data-sender. The RFCN algorithm requires that each forward queue has access to the data structures of its corresponding backward queue and vice versa. If used in combination with RFCN, the BUC algorithm calculates the window at the forward queue and sets the header field of ACKs at the corresponding backward queue.

SUMMARY OF THE INVENTION

It is an object of the present invention to provide a reliable and fast adaptation of the transmission speed of a sender in a radio communication environment while unnecessary retransmissions are avoided.

In accordance with one aspect of the present invention, a packet data transmission network system comprises a receiver, and a sender for transmitting data packets to the receiver through a packet data connection via a network element. The receiver is arranged to acknowledge each received data packet by an acknowledgment message containing header data comprising a window size. The number of transmitted bytes for which the sender has not received an acknowledgement from the receiver does not exceed the window size. The network element is arranged to buffer data packets transmitted by the sender and examine and modify the header data. The network element is also arranged to detect transmission conditions comprising radio conditions and modify the window size accordingly. The present invention is also directed to an associated data transmission method and an appropriate network element.

According to the present invention, the information about the receiving ability of a receiver can be sent to the sender right away or even in advance, in case decreasing conditions are detected in the mobile system.

Furthermore, according to the present invention, the throughput and efficiency of TCP/IP connections through packet data in GPRS/3G is optimized. The present invention is fully compliant with existing TCP/IP stacks and requires therefore no modification of the involved parties. Only the header compression routine (or a routine logically close to the header compression) in the SGSN network element requires new code.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

DESCRIPTION OF THE PREFERRED EMBODIMENT

Figure 1:
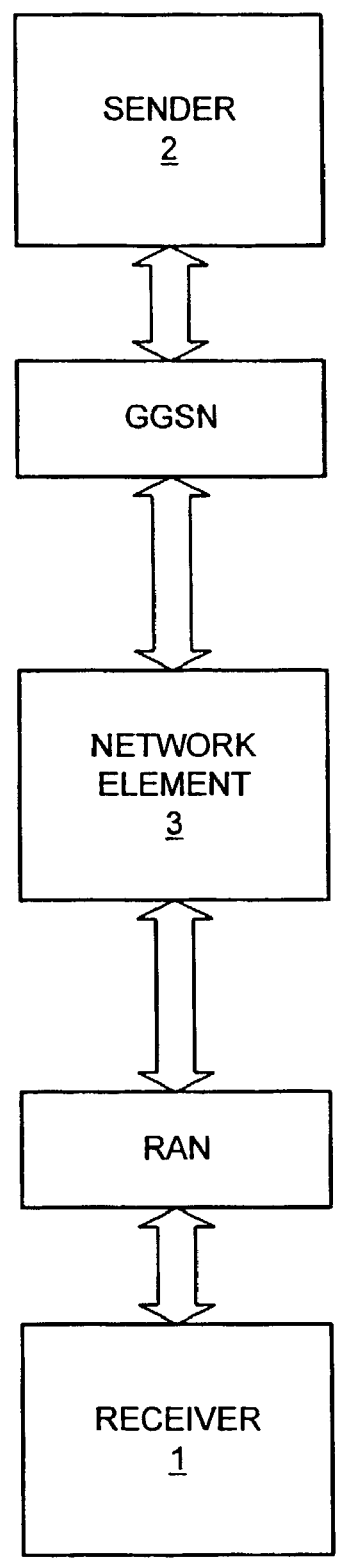
FIG. 1 shows a schematic block diagram of a packet data transmission network system according to the present invention.

FIG. 1 shows a schematic block diagram of a packet data transmission network system according to the present invention. According to FIG. 1, a receiver 1 like a mobile terminal has a packet data connection such us TCP/IP with a sender 2 like a service provider. In the system which may comprise a radio part, a network element 3 is used for buffering downlink TCP/IP data packets sent from the service provider 2 via a GGSN (Gateway GPRS Support Node) during a transmission operation and for performing TCP/IP header compression. In GPRS, the network element 3 may be a Serving GPRS Support Node (SGSN). According to UMTS, the network element 3 may be Radio Network Controller (RNC).

In a transmission operation, the service provider 2 sends TCP/IP data packets to the mobile terminal 1 via the GGSN, the network element 3 and an RAN (Radio Access Network), and the mobile terminal 1 acknowledges the receipt of the data packets using acknowledgment messages. In order to make the transmission more efficient, in TCP/IP there is used a windowing mechanism. According to this windowing mechanism, each TCP packet contains a field that tells how may bytes the receiver is still able to receive. Thus, the service provider 2 knows how many bytes sill can be sent, and it is possible to send the next packet before an acknowledgment message for the previous packet is received. Hence, the window size determines how many new packets can be sent before the acknowledgment for the previous packet is received.

Figure 2:
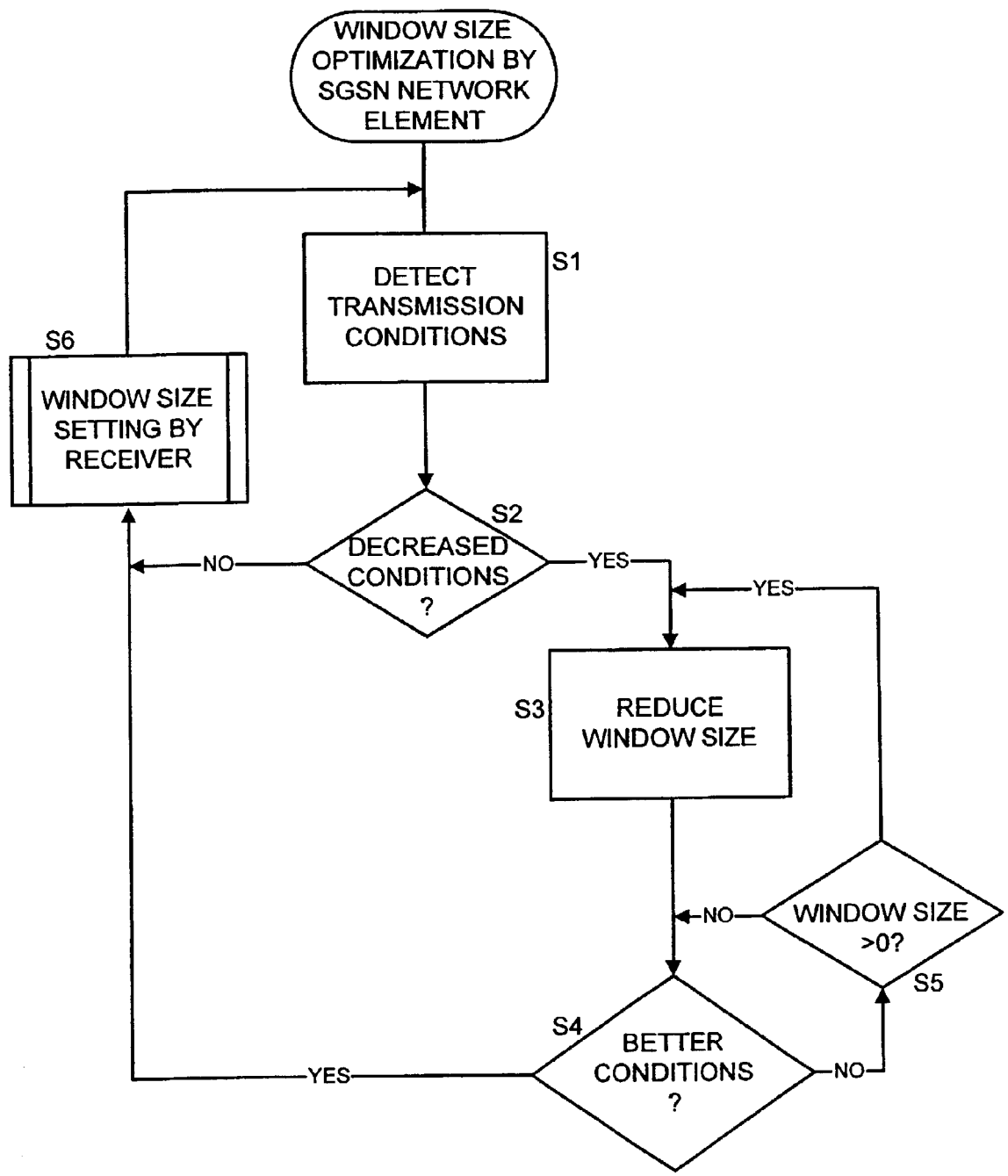
FIG. 2 shows a flowchart of an example of the operation of an SGSN network element for optimizing a window size according to the present invention.

In the following, an example of the operation of the SGSN network element 3 for optimizing the window size will be described with reference to the flowchart in FIG. 2.

The SGSN network element 3 which is aware of radio conditions and its buffering capacity present during a transmission operation monitors the TCP window field in the acknowledgment messages (step S1). When the SGSN network element 3 detects that the radio conditions are getting poorer, i.e. the transmission rate decreases (step S2), the SGSN network element 3 starts changing the window size field of the mobile terminal 1 to a lower value or even to 0 in the TCP/IP connection (step S3). Hence, the service provider 2 is not allowed to send any packets when the window size is 0 and the downlink traffic will thus be decreased. In step S4, the SGSN network element checks whether the conditions are getting better or whether it has no large amount of data buffered anymore for the connection. If YES in step S4, the SGSN network element quits changing the TCP window field and allows the mobile terminal 1 to specify a normal window size (step S6). On the other hand, if NO in step S4, the SGSN network element checks whether the window size is larger than 0 (step S5), and if YES, reduces the window size again.

As a result, according to the present invention a method is provided to inform the service provider 2 as the sender of TCP/IP packets to decrease the sending rate so that retransmissions can be avoided. Conventionally, TCP fields are not touched by any intermediate node but according to the present invention, the SGSN network element 3 modifies the window field to achieve reliable and fast adaptation to changed conditions.

With the TCP window size modification according to the present invention which is carried out by the SGSN network element 3, the adaptation to better conditions is very fast since the extra knowledge of the SGSN network element about changed conditions can be used in modifying the window size in the acknowledgment message.

According to the TCP window size optimization of the present invention, the window size can be adapted with high speed to changed conditions. When the SGSN network element 3 detects an adversely change in conditions, the SGSN network element 3 sets the window size in the acknowledgment message to a lower value or even to 0. If the SGSN network element 3 detects that the conditions are getting better it stops setting the window size to a lower value and, thus, the rate can instantly be increased. Furthermore, the TCP window field approach according to the present invention enables better fine tuning of the connection since the window size has not to be set immediately to 0.

The TCP window size optimization according to the present invention needs to be applied to all active TCP connections for the specific mobile terminal. This, however, does not increase the complexity since the same modifying operation can be done for all these connections as they end up in the same mobile terminal.

The present invention can be implemented in connection with the TCP/IP header compression in which the SGSN network element examines and modifies the TCP headers anyway. This makes the implementation of this invention quite easy.

According to the present invention, the throughput and efficiency of TCP/IP connections through packet data in GPRS/3G is optimized. The present invention is fully compliant with existing TCP/IP stacks and requires therefore no modification of the involved parties. Only the header compression routine (or a routine logically close to the header compression) in the SGSN network element requires new code.

While the invention has been described with reference to a preferred embodiment, the description is illustrative of the invention and is not to be construed as limiting the invention. Various modifications and applications may occur to those skilled in the art without departing from the scope of the invention as defined by the appended claims.

What is claimed is:

1. A packet data transmission network system, comprising:
 a receiver;
 a network element; and
 a sender for transmitting data packets to the receiver through a packet data connection via the network element and a radio part, the receiver being arranged to acknowledge each received data packet by an acknowledgment message containing header data comprising a field indicating a window size, a number of transmitted bytes for which the sender has not received an acknowledgment from the receiver being not allowed to exceed the window size;
 wherein said network element is arranged to buffer data packets transmitted from the sender to the receiver and to receive the acknowledgement message transmitted from the receiver to the sender, detect transmission conditions comprising buffering conditions of the data packets at said network element and radio conditions of the radio part between the sender and the receiver, and modify the field indicating the window size included in the acknowledgement message in accordance with the transmission conditions.

2. The system according to claim 1, wherein said network element is arranged to modify the window size to a lower value when said network element detects a decreasing quality of transmission conditions.

3. The system according to claim 1, wherein said network element is arranged to quit modifying the window size when said network element detects that a quality of transmission conditions is increasing and allow the receiver to set the window size normally.

4. The system according to claim 1, wherein the packet data connection comprises a TCP/IP connection.

5. The system according to claim 1, wherein said network element comprises an SGSN network element for performing header compression.

6. The system according to claim 2, wherein said network element is arranged to quit modifying the window size when said network element detects that a quality of transmission conditions is increasing and allow the receiver to set the window size normally.

7. The system according to claim 2, wherein the packet data connection comprises a TCP/IP connection.

8. The system according to claim 3, wherein the packet data connection comprises a TCP/IP connection.

9. The system according to 2, wherein said network element comprises an SGSN network element for performing header compression.

10. The system according to 3, wherein said network element comprises an SGSN network element for performing header compression.

11. The system according to 4, wherein said network element comprises an SGSN network element for performing header compression.

12. A network element in a packet data transmission network system, comprising:
 buffering means for buffing data packets transmitted by a sender to a receiver through a packet data connection via a radio part, the receiver being arranged to acknowledge each received data packet by an acknowledgment message containing header data comprising a field indicating a window size, and for receiving the acknowledgement message transmitted from the receiver to the sender, a number of transmitted bytes for which the sender has not received an acknowledgment from the receiver being not allowed to exceed the window size;
 detecting means for detecting transmission conditions comprising buffering conditions of data packets at said network element and radio conditions of the radio part between the sender and the receiver; and
 modifying means for modifying the field indicating the window size included in the acknowledgement message in accordance with the transmission conditions.

13. The network element according to claim 12, wherein said modifying means is arranged to modify the window size to a lower value when said detecting means detects a decreasing quality of transmission conditions.

14. The network element according to claim 12, wherein said modifying means is arranged to quit modifying the window size when said detecting means detects that a quality of transmission conditions are increasing.

15. The network element according to claim 12, wherein the transmission conditions detected by said detecting means comprise buffering conditions of data packets at said buffering means.

16. The network element according to claim 13, wherein said modifying means is arranged to quit modifying the window size when said detecting means detects that the quality of transmission conditions are increasing.

17. The network element according to claim 13, wherein the transmission conditions detected by said detecting means comprise buffering conditions of data packets at said buffering means.

18. The network element according to claim 14, wherein the transmission conditions detected by said detecting means comprise buffering conditions of data packets at said buffering means.

19. A packet data transmission method, comprising the steps of:

- transmitting data packets from a sender to a receiver through a packet data connection via a network element and a radio part, the receiver acknowledging each received data packet by an acknowledgment message containing header data comprising a field indicating a window size, a number of transmitted bytes for which the sender has not received an acknowledgment from the receiver being not allowed to exceed the window size;

- buffering, in said network element, data packets transmitted from the sender to the receiver, and receiving, in said network element, the acknowledgement message transmitted from the receiver to the sender; and

- detecting transmission conditions comprising buffering conditions of the data packets at said network element and radio conditions of the radio part between the sender and the receiver; and

- modifying the field indicating the window size included in the acknowledgement message in accordance with the transmission conditions.

\* \* \* \* \*